United States Patent [19]

Nikkuni

[11] Patent Number: 4,501,550

[45] Date of Patent: Feb. 26, 1985

[54] CAP MEANS FOR PREVENTING RESIN FROM REMAINING IN A MOLD OF A RUNNERLESS INJECTION MOLDING APPARATUS

[75] Inventor: Hiroharu Nikkuni, Yonezawa, Japan

[73] Assignee: Shigeru Tsutsumi, Yonezawa, Japan

[21] Appl. No.: 445,841

[22] Filed: Nov. 30, 1982

[30] Foreign Application Priority Data

Dec. 2, 1981 [JP] Japan ................................ 56-192736

[51] Int. Cl.³ .............................................. B29F 1/03
[52] U.S. Cl. ................................... 425/549; 425/548; 425/566; 425/571
[58] Field of Search ................ 425/549, 548, 566, 571

[56] References Cited

U.S. PATENT DOCUMENTS

| | | | |
|---|---|---|---|
| 4,161,386 | 7/1979 | Osuna-Diaz | 425/549 |
| 4,173,448 | 11/1979 | Rees et al. | 425/549 |
| 4,212,625 | 7/1980 | Shutt | 425/549 |
| 4,268,241 | 5/1981 | Rees et al. | 425/549 |
| 4,276,015 | 6/1981 | Rogers | 425/549 X |
| 4,312,630 | 1/1982 | Travaglini | 425/549 X |

Primary Examiner—J. Howard Flint, Jr.
Attorney, Agent, or Firm—Kramer and Brufsky

[57] ABSTRACT

This invention relates to cap means for preventing resin from remaining in a mold of a runnerless injection molding apparatus. The cap means is of a frusto-conical profile and incorporated in a space formed adjacent to a front end of a heating cylinder. Further, the cap means is provided with an opening from which a pointed tip member of the heating cylinder can project. The invention aims at removing resin scorching, its thermal decomposition, inconveniences of color or material exchange or the like.

4 Claims, 6 Drawing Figures

CAP MEANS FOR PREVENTING RESIN FROM REMAINING IN A MOLD OF A RUNNERLESS INJECTION MOLDING APPARATUS

BACKGROUND OF THE INVENTION

The present invention relates to cap means for preventing resin from remaining in a mold of a runnerless injection molding apparatus. By decreasing resin remaining in the mold as less as possible, any resin sensitive to the plasticity temperature may be molded smoothly.

A conventional mold 1 of a runnerless injection molding apparatus is disclosed in FIG. 1. According to this example, a plurality of cavities 2 are disposed in the mold 1 in order to produce a large number of small-sized molded articles in one injection shot. A certain quantity of fused resin passes through a runner 3. The resin therein is fused by heater means 4 built into a heating cylinder 7. A pointed heating tip member 6 is fixed with the heating cylinder 7 to heat the area of a gate 5. Each heating cylinder 7 comprising the heater means 4 and the pointed tip member 6 is disposed in a preferred position of the mold 1 opposing to each cavity 2. A flange 7a of the heating cylinder 7 is fixed with the mold 1 by means of a runner plate 8 and screws 9. The runner plate 8 is provided with a bushing 10 for contacting a cylinder nozzle of an injection molding machine. A sprue 11 which passes through the bushing 10 is communicated with each gate 5 by way of the runner 3. Numeral 12 is a cartridge heater to constantly heat and fuse the resin in the runner 3 formed in the plate 8. The pointed tip means is particularly to heat and fuse the resin in the gate 5 which was cooled and solidified locally at the mold opening time.

In such a conventional runnerless type mold, the resin in the runner 3, which is a resin flow passage of the heating cylinder 7, is constantly heated to a desired temperature by the heater means 4 and place in a fused condition. Accordingly, when the mold is opened, there is no solidified sprue or runner taken away together with the molded articles. However, as shown in FIG. 2(a), since a space 13 is formed in the mold 1 enclosed by a periphery 7a of the heating cylinder 7 and the pointed tip member 6, the resin injected from the injection molding machine flows in an arrow direction A through the runner 3 in the heating cylinder 7 and is injected into the cavity 2 through the gate 5. Then, the disadvantage is that a certain quantity of resin will remain in the space 13 shown by dotted lines in FIG. 2. The remaining resin is inclined to increase temperature inevitably because its heating time is prolonged due to heating of the heater means 4. Such a prolonged heating is very disadvantageous for the resin of non-flammability and self-extinguishing properties. Particularly, when resins such as polyvinyl chloride resin remain for a long time in the space 13, toxic gas may result due to thermal decomposition. Further, when changing the resin color, the resin of previous color remains in the space 13, thereby a newly changed resin color is forced to mix with the previously fused resin of a different color. As a result, the color of the newly colored resin becomes bad. Accordingly, unless the remaining resin is removed from the space 13, a color change is not available. Of course, the same phenomenon arises at the time when replacing a previously used resin with a different resin.

The task of the present invention is to remove the aforesaid disadvantages of the conventional art.

BRIEF SUMMARY OF THE INVENTION

Accordingly, it is a general object of this invention to provide cap means for preventing resin from remaining in a mold of a runnerless injection molding apparatus, thereby removing resin scorching, its thermal decomposition, inconveniences of color or material exchange or the like.

These and other objects and advantages of this invention will become apparent from the following description of examples with reference to the accompanying drawings.

DETAILED DESCRIPTION OF THE INVENTION

Figure 1:
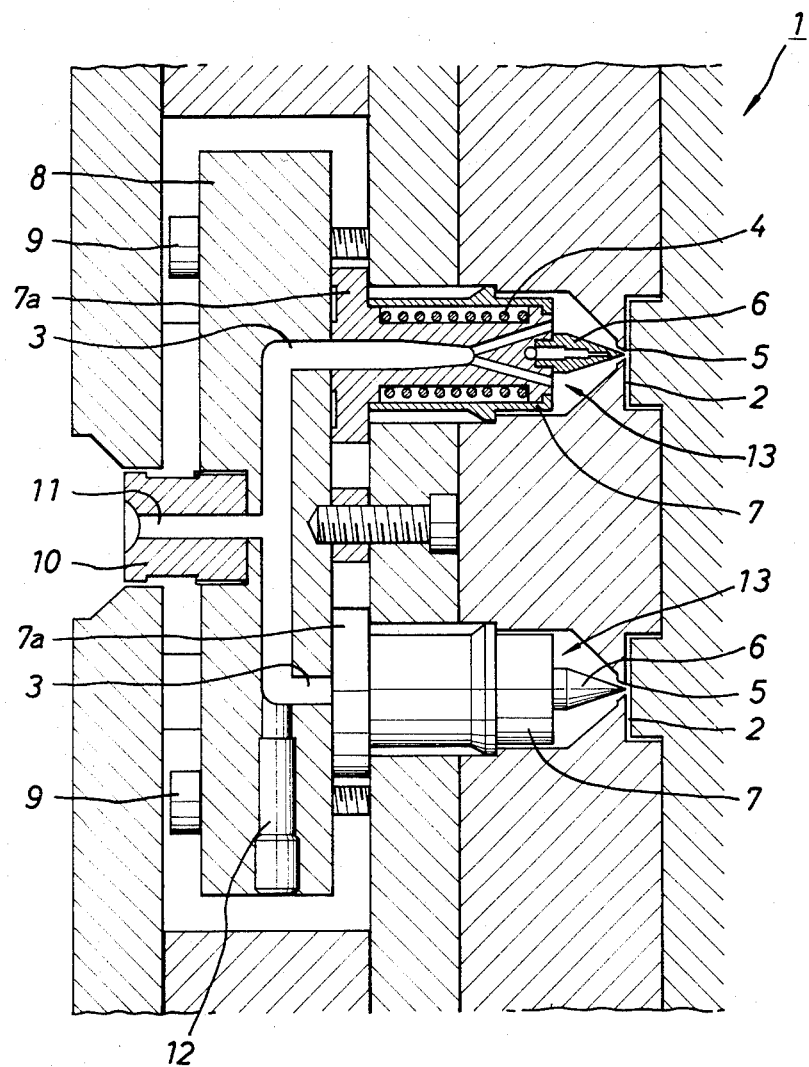
FIG. 1 is a section view of an example of a conventional mold of a runnerless injection molding apparatus.
Figure 2A:
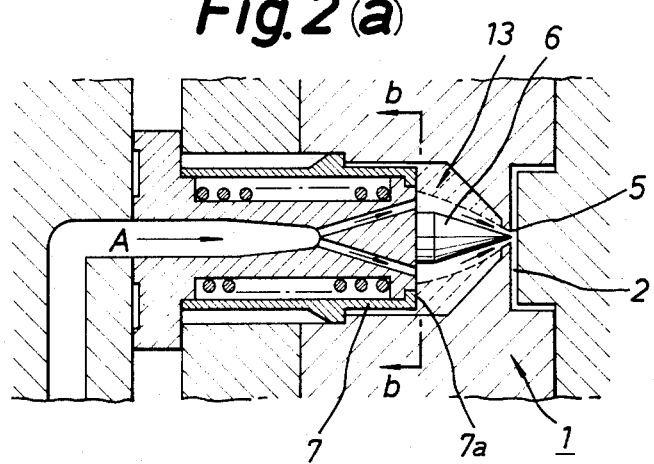
FIG. 2(a) is an enlarged section view of a main part of the example in FIG. 1.
Figure 2B:
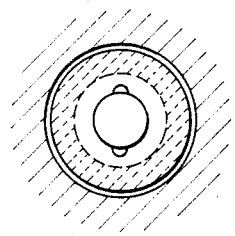
FIG. 2(b) is a front view taken on line b—b of FIG. 2(a)
Figure 3:
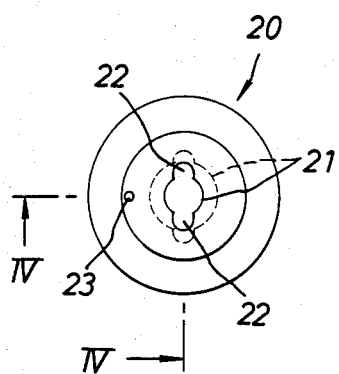
FIG. 3 is a front view of an example of the cap means according to this invention.
Figure 4:
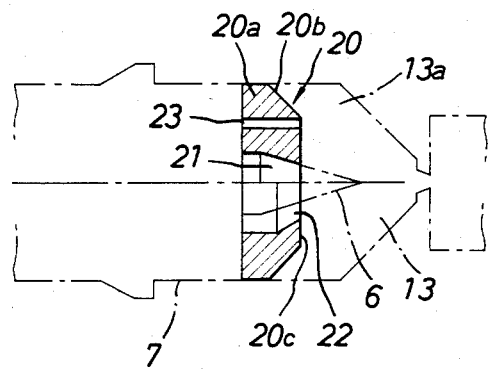
FIG. 4 is a side view taken on line IV—IV of FIG. 3.

A preferred example of this invention will now be described with reference to FIGS. 3 to 5. Since the same construction as shown in FIG. 1 has the same numerals, its description will be omitted.

Numeral 20 is a cap for preventing resin from remaining in a mold, of which the outer profile is frustoconical. The cap 20 is incorporated in a larger diameter portion 13a of the space 13. The cap 20 comprises a cylindrical portion 20a of which the diameter is nearly identical with that of the larger diameter portion 13a, a slope 20b and a flattened surface 20c. Further, the cap 20 is provided in its center axis with an opening 21, so that the pointed tip member 6 can project from the opening 21. The opening 21 is provided with a passage 22 through which fused resin can pass. The form of the passage 22 is not always limited to that illustrated in the drawings. If the fused resin can pass through it smoothly, any shape is acceptable. Numeral 23 is a knock pin hole for inserting a pin for fixing the cap 20.

The material of the cap 20 is preferably made of a nonorganic material, e.g. a ceramic one in the case where a resin having a plasticity temperature of no less than 250° C. is used for injection molding. In the case where a resin having a plasticity temperature of no more than 250° C. is used, the material of the cap 20 is preferably made of a nonadhesive material e.g. polytetrafluoroethylene. Further, it may also be made of a steel material to which any molding material is prevented from adhering.

The function of the cap 20 will now be described.

Figure 5:
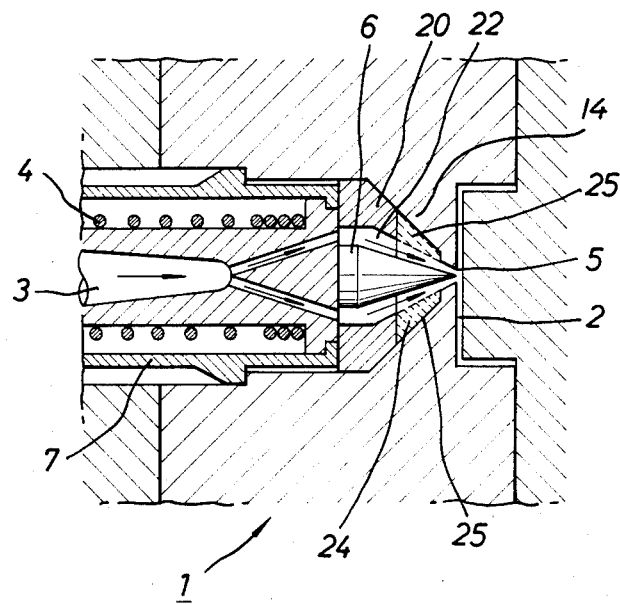
FIG. 5 is a sectional view of a main part showing the function of this invention.

The cap 20 for preventing resin from remaining in the mold is fixed with the front end of the heating cylinder 7 by means of the pin (not illustrated) as shown in FIG. 5. The cap 20 is suitably seated in the larger diameter portion 13a of the space 13, thereby preventing resin from remaining in the space 13.

What is more remarkable is that the head of the semiconical cap 20 is flattened, so that there is formed a remainder space 24 adjacent to a tapered end of the space 13. In the remainder space 24 remains the resin 25 (dotted in FIG. 5) which was injected by the injection molding machine. The remaining resin 25 is separated from the heater means 4 as a heat source due to the arrangement of the cap 20. Moreover, since it exists in a direct contact with the mold wall 14 of which temperature is considerably lower than that of the resin decomposition, it is placed in condition of suitably lowered temperature. Accordingly, neither resin scorching nor its thermal decomposition arises. In addition, the remaining resin 25 performs the function of suitable heat insulation, prevents the resin flowing upon the pointed tip member 6 adjacent to the gate 5 from radiating and cooling excessively, and further is free from excessive heating to be caused by a relatively weak heat power of the tip member 6. Thus, resin maintaining a good fusing condition can be supplied into the cavity 2.

Further, it should be mentioned that the tip member 6 may be replaced with the pointed intermittent heater as disclosed in U.S. Pat. No. 3,800,027. Or, it may be simply a heater.

On the other hand, when doing the color exchange of resin, a different colored resin is injected into the cavity 2 through the passage 22. Mixing of the different colored resin with the resin 25 is prevented because the flattened surface 20c of the cap 20 acts as an obstacle and also because resin 25 is at a lowered temperature.

As a result of the experiment in which a white color resin and a black color resin have been used alternately, it was confirmed that any color change of the molded articles was not found. Likewise, the resin material exchange has also been done without any trouble.

According to an outstanding aspect of this invention, in order to prevent resin from remaining in a mold, cap means of a frusto-conal profile is inserted in an area formed adjacent to a front end of a heating cylinder of a runnerless injection mold. Thus, various inconveniences caused by remaining of the resin in the above area are removed. As a result, any resin sensitive to the plasticity temperature may be added smoothly.

As many apparently widely different embodiments of this invention may be made without departing from the spirit and scope thereof, it is to be understood that the invention is not limited to any specific embodiment thereof except as defined in the appended claims.

What is claimed is:

1. In a runnerless injection molding apparatus having a pointed heating tip member for heating a gate, permanently open passage surrounded by a mold wall for supplying a fused resin into a cavity through said gate along the surface of said pointed heating tip member, and a heating cylinder having heater means to be heated externally of the passage, the improvement comprising:

cap means for preventing resin from collecting and remaining in a space formed adjacent to a front end of said heating cylinder, said cap means being of a frusto-conical profile incorporated in said space and being provided in its center with an opening to maintain said permanently open passage and through which an end of said pointed heating tip member can pass in an axial direction of said cap means, and a remainder space formed adjacent to a front end of said cap means for collecting a small portion of resin to provide a thermally insulating interface between said mold wall and fused resin passing along the surface of said heating tip, said cap means thermally insulating said remainder space from the front end of said heating cylinder, whereby resin supplied into said cavity is maintained in proper molding condition and scorching and thermal decomposition of resin collected in said remainder space is prevented.

2. The cap means claimed in claim 1, wherein the material of the cap means is made of a ceramic material in case the resin having the plasticity temperature of no less than 250° C. is used for injection molding.

3. The cap means claimed in claim 1, wherein the material of the cap means is made of polytetrafluoroethylene resin in case the resin having the plasticity temperature of no more than 250° C. is used for injection molding.

4. The cap means claimed in claim 1, wherein the cap means is provided with a pin hole for use in fixing the cap means to said mold wall.

* * * * *